United States Patent

Havas et al.

[11] Patent Number: 5,403,994
[45] Date of Patent: Apr. 4, 1995

[54] SELECTIVELY ADJUSTABLE TRANSVERSE FLUX HEATING APPARATUS

[75] Inventors: George Havas, Youngstown; Charles N. Howell, Poland; Joseph E. Quaranta, Youngstown, all of Ohio

[73] Assignee: Ajax Magnethermic Corporation, Warren, Ohio

[21] Appl. No.: 195,254

[22] Filed: Feb. 14, 1994

[51] Int. Cl.6 ............................... H05B 6/40
[52] U.S. Cl. .................. 219/645; 219/670; 219/675; 219/656
[58] Field of Search ............... 219/645, 670, 656, 647, 219/672, 675, 676

[56] References Cited

U.S. PATENT DOCUMENTS

| | | | |
|---|---|---|---|
| 2,448,009 | 8/1948 | Baker | 219/645 |
| 3,444,346 | 5/1969 | Russell et al. | 219/645 |
| 3,842,234 | 10/1974 | Seyfried | 219/637 |
| 4,185,183 | 1/1980 | Kamimoto | 219/645 |
| 4,258,241 | 3/1981 | Soworowski | 219/656 |
| 4,300,031 | 11/1981 | Reboux et al. | 219/670 |
| 4,694,134 | 9/1987 | Ross | 219/670 |
| 4,751,360 | 6/1987 | Ross | 219/645 |
| 4,795,872 | 1/1989 | Hagisawa et al. | 219/645 |
| 4,891,484 | 1/1990 | Waggott et al. | 219/645 |
| 5,001,319 | 3/1991 | Holmstrom | 219/645 |

FOREIGN PATENT DOCUMENTS 2144609  8/1983  United Kingdom .
WO90/07584  7/1990  WIPO .

Primary Examiner—Philip H. Leung
Attorney, Agent, or Firm—Fay, Sharpe, Beall, Fagan, Minnich & McKee

[57] ABSTRACT

Transverse flux heating assembly for inductively heating a moving strip includes opposite spaced J-shaped conductors to form an inductive heating coil. The coils define a middle spacing therebetween which is unobstructed by flux guides to permit free translation movement between the conductors in a direction parallel to the strip width. The inductors provide a fully adjustable coil width to accommodate different strip widths in the heating operation.

7 Claims, 5 Drawing Sheets

SELECTIVELY ADJUSTABLE TRANSVERSE FLUX HEATING APPARATUS

BACKGROUND OF THE INVENTION

This application relates to transverse flux heating and more particularly to inductive heating of a continuously moving metal strip or plate. The invention is particularly applicable to systems wherein the moving sheet, strip or plate can vary in width so that a corresponding adjustability in heating coil dimensions is highly desirable.

Transverse flux heating with J-shaped conductor assemblies is known. U.S. Pat. No. 4,751,360, herein incorporated by reference, provides a detailed disclosure of such conductors and their operational advantages for strip heating. However, as shown in the reference, it was thought that the J-shaped conductors needed to be imbedded in flux guides adjacent to the three sides of the conductors, except for the side facing the strip, to facilitate the production of a magnetic field which is essentially transverse to the plane formed by the strip.

Design considerations in any such heating system seek to predictably control the currents in the strip and provide for adjustability in the inductor width to permit it to handle different strip widths. Some prior known systems have had to provide a different sized inductor for each discrete strip width. Other schemes have been devised for making the inductor width adjustable but have been encumbered by the fact that the iron laminations of the flux guides filling the space between the adjacent J conductors have to be either removed or added according to the selected sizing of the inductor width. In other words, the number of laminations between the go and return conductors of the heating assembly were increased with an expansion of conductor width, or, correspondingly lessened with a reduction in inductor width.

The apparent problems of disassembly and assembly of such heating apparatus and the corresponding addition and subtraction of laminations has substantially encumbered the efficiency of adjustment of the heating assembly and its ability to handle the various strip widths.

Another prior art problem which has been identified with those systems seeking to include a relatively adjustable J-shaped inductors, is the occurrence of relatively intense magnetic fields at closely spaced straight extensions of the J-shaped conductors. The extended ends of the J-shaped inductors which are connected to the power supply connections are relatively closely spaced and an intense magnetic flux field occurs therebetween. When the edge of the strip is exposed to this field, undesirable edge heating occurs.

The subject invention comprises a new and improved transverse flux heating system which is readily adjustable to accommodate various strip widths, provides acceptable control of currents along the edges of the strip and is simple in construction and operation for improved efficiency in its adjustability to selectively variable inductor width dimensions.

BRIEF SUMMARY OF THE INVENTION

In accordance with the present invention there is provided an adjustable width transverse heating assembly for induction heating of a moving metal strip. The heating assembly includes first and second J-shaped inductors disposed to comprise an inductive heating coil relative to the strip. The conductors are arranged to have a middle spacing formed in an internal cross-sectional area of the coil. First and second flux guides are associated respectively with the first and second J-shaped conductors to enhance communication of the magnetic field in a direction transverse to a plane formed by the strip. The flux guides are disposed about the conductors and spaced from the middle space to accommodate selective relative translation of the conductors in a direction parallel to the strip width.

In accordance with other features of the subject invention, flux guides are disposed on sides of the conductors spaced opposite of the coil and opposite of the middle spacing formed in the internal cross-sectional area.

In accordance with yet another feature of the invention, the heating assembly includes a flag portion for shielding the strip from flux generated between the straight terminal end portions adjacent edge portions of the strip. The flag portion is disposed to reduce the magnetic flux at the edge of the strip.

An important benefit of the subject invention is a fully adjustable J-shaped inductor which can accommodate easily and simply varying strip width sizes.

A further benefit of the present invention is an adjustable transverse flux heating assembly which provides improved and controlled edge portion heating.

Other benefits and advantages of the subject new invention will become apparent to those skilled in the art upon a reading and understanding of this specification.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof and wherein.

DETAILED DESCRIPTION OF THE INVENTION

Figure 1:
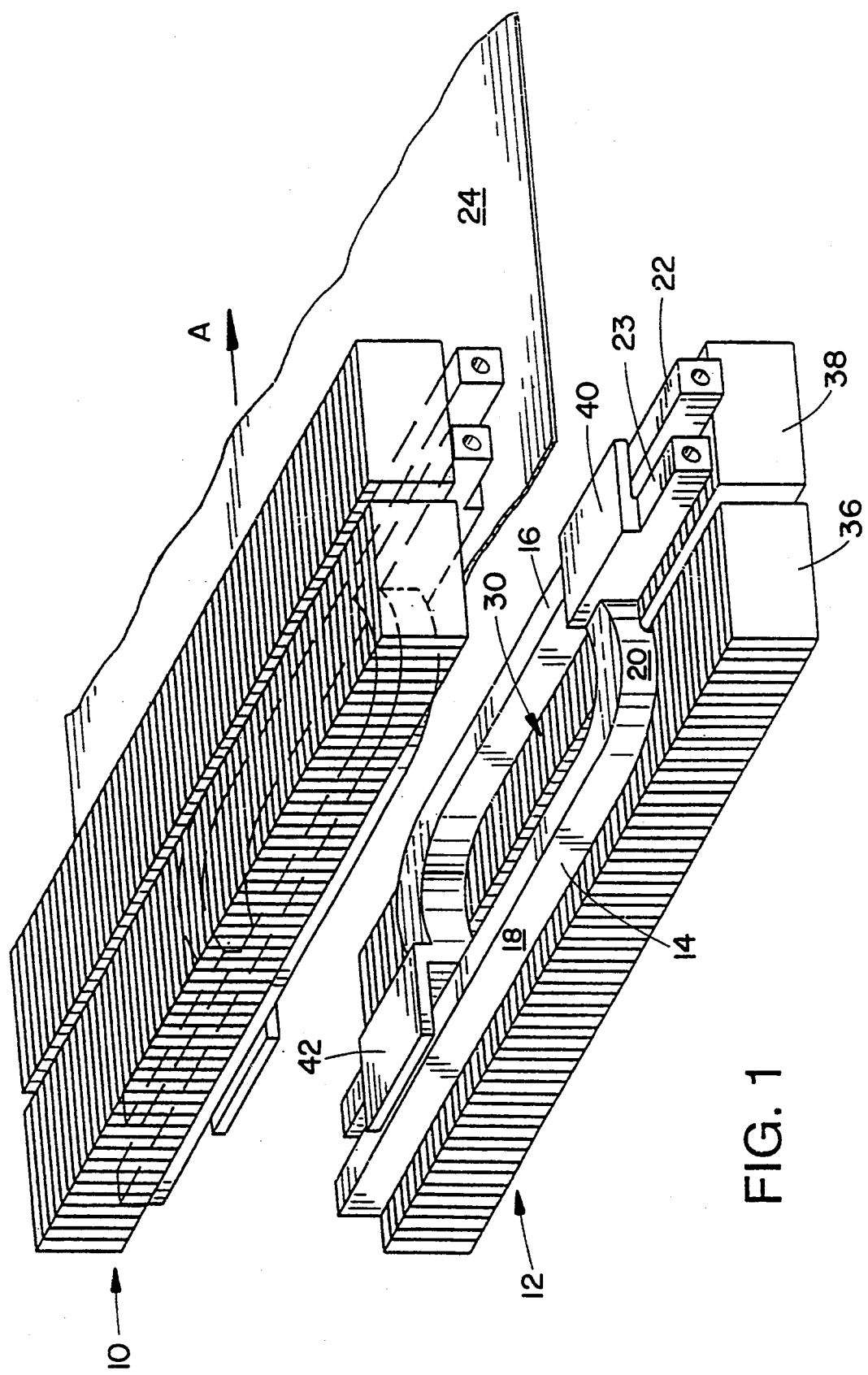
FIG. 1 is a perspective view of inductor coils formed in accordance with the present invention showing a top coil in partial phantom by dotted lines.

Referring now to the drawings wherein the showings are for purposes of illustrating the preferred embodiments of the invention only, and not for purposes of limiting same, the FIGURES show an adjustable width transverse heating system (TFIH) for induction heating of a moving metal strip. With particular reference to FIG. 1, a pair of opposed induction coil assemblies 10, 12 are spaced to accommodate a moving metal strip 24 that passes between them for inductive heating. The coils are usually mirror images of one another and are each comprised of a first J-shaped conductor 14 and a second J-shaped conductor 16. The conductors 14, 16 are disposed adjacent one another to form an inductive coil relative to a strip moving in the direction of the arrow A. Each conductor has a relatively straight section 18, a curved section 20 and a straight terminal end portion 22. The oppositely facing J configuration of the conductors results in the formation of a middle spacing 30 formed within the perimeters of an internal cross-sectional area of the coil defined by the two J's. Accordingly, magnetic flux lines can pass about the conductors 16, 18 in a transverse direction relative to a strip moving therebetween.

It is a particular feature of the invention that first and second flux guides 36, 38 are associated respectively with the first and second J-shaped conductors 14, 16. The flux guides 36, 38 serve to enhance transmission of the magnetic field and maintain it in a direction transverse of the plane formed by the moving strip. The flux guides are disposed about the conductors 14, 16 so that the conductors can be selectively moved relative to each other in a direction parallel to the strip width to allow the adjustment of the coil to accommodate various strip widths.

With particular reference to the coil assembly 12, it can be seen that the flux guides 36, 38 are disposed on a single side of the conductors that is, on the side of the conductor which is opposite of the side facing the strip 24. The other three sides of each conductor are exposed to allow relative free translation of each conductor to the other in a direction parallel to the strip width. In other words, and in a conventional jargon, the "GO" conductor 14 can freely move relative to the "RETURN" conductor 16 by merely sliding each relative to the other and thereby increasing or decreasing the middle spacing 30 determined by the size of the strip width 24 to be heated.

Prior art flux guides were thought to be necessary to have a shape that extended into the middle space to enhance the communication of the magnetic field to the strip 24. However, such flux guides in the middle spacing 30 would have to be removed to lessen the width of the middle spacing, and if the middle spacing were increased, additional flux guides would have to be inserted therein. The present invention allows for a fully adjustable heating system without obstruction from flux guide portions. The ease in adjustment resulting from the invention can be easily appreciated.

With continued reference to FIG. 1, it is another feature of the invention that the conductors 14, 16 include flag or tab portions 40, 42 at the terminal end portions 22 of each J conductor. The tabs 40, 42 essentially comprise a copper shield which forms a flux shield between the conductors. The tabs 40, 42 are planar configured to provide a substantially extensive cross-sectional area which can shield flux lines passing between the straight terminal end portion 22 of the conductor and the opposite terminal end portion 23 at the curve portion 20 from an end of the strip 24. In other words, the close proximity of the straight portions 22, 23 was found to create relatively intense magnetic flux lines passing therebetween which would cause undesirable edge heating in the strip 24. To better control the edge heating properties of the system, the tab portions 40, 42 obstruct the lines so that the system can more reliably accomplish its goal of uniform strip heating.

The subject invention not only allows a practically adjustable induction heating system, but actually provides an improvement in the electrical efficiency over prior art systems.

In transverse flux heating the aim is to guide as much of the magnetic flux through the strip as possible, and to do so in such a manner that the induced current in the strip mirrors the inductor current. In general, the narrower the path of the current in the strip, the larger the effective strip resistance. Hence, the induced power for a given current will increase, since $P = I^2 R$.

Figure 5:
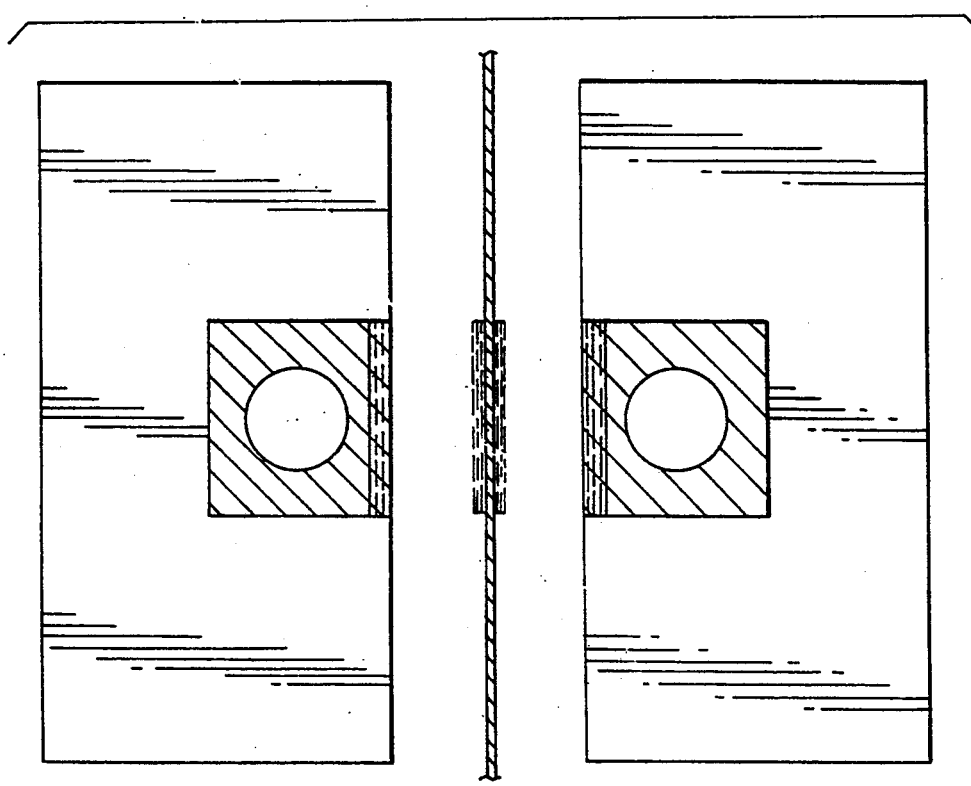
FIG. 5 is a cross-sectional illustration of a prior art heating assembly particularly illustrating current flow in a conductor and induced current in a workpiece strip; and, FIG. 6 is a cross-sectional illustration, comparable to FIG. 5 showing current flow in an assembly formed in accordance with the present invention.

FIG. 5 shows a prior art system having conductors of the inductor buried in iron laminations. The currents in both the top and bottom conductors flow in the same direction. The induced current in the strip flows in the opposite direction to that of the inductor. The current in the conductors is concentrated to the side of the conductors which face the strip. Practically no current flows anywhere else in the conductors. The current flowing in the strip flows in a slightly wider path, but for a properly designed TFIH application it closely approximates the width of the current flowing in the conductors.

Figure 6:
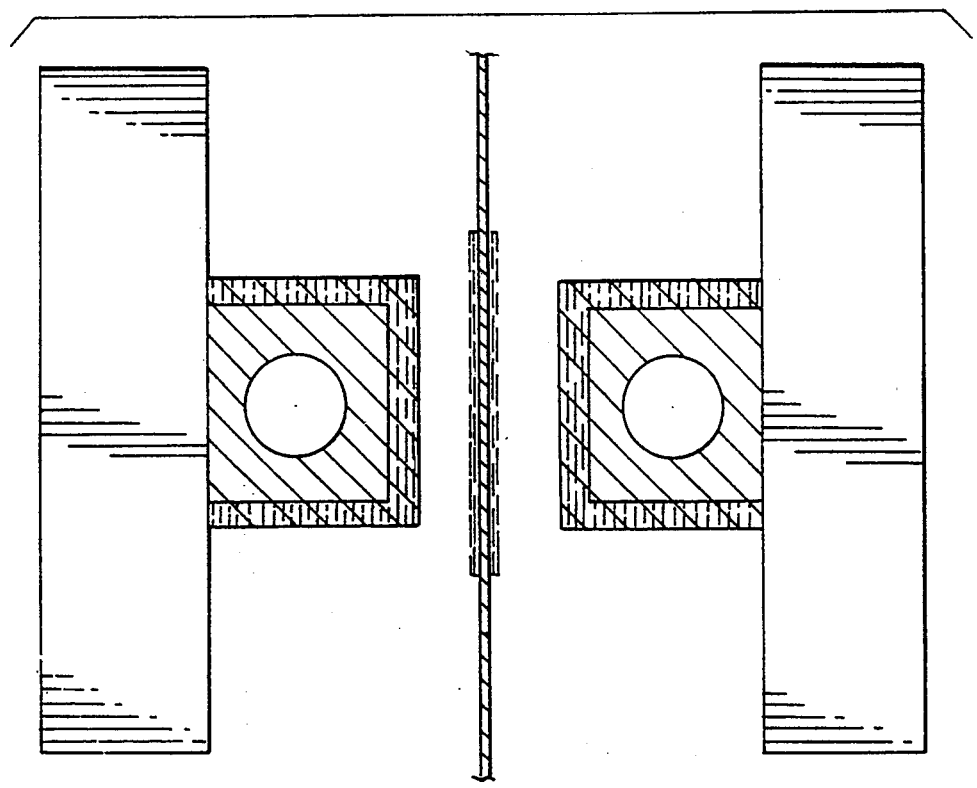

FIG. 6 shows the subject invention where the iron laminations only back up the conductors. Under this condition, current will flow on three sides of the conductors, reducing the effective resistance of the conductors. The current in the strip will take a wider path which reduces the effective resistance of the strip. Calculations predicted and experimental results bear out that the reduction in strip resistance is actually slightly less than the drop in the conductor resistance, yielding slightly higher electrical efficiency. This can be clearly seen if one examines the formula yielding electrical efficiency.

$$\eta = \frac{R_{Strip}}{R_{Strip} + R_{Conductors}} \times 100 \, (\%)$$

Any increase in the ratio of $R_{Strip}/R_{Conductors}$ will yield increased electrical efficiency.

Figure 2:
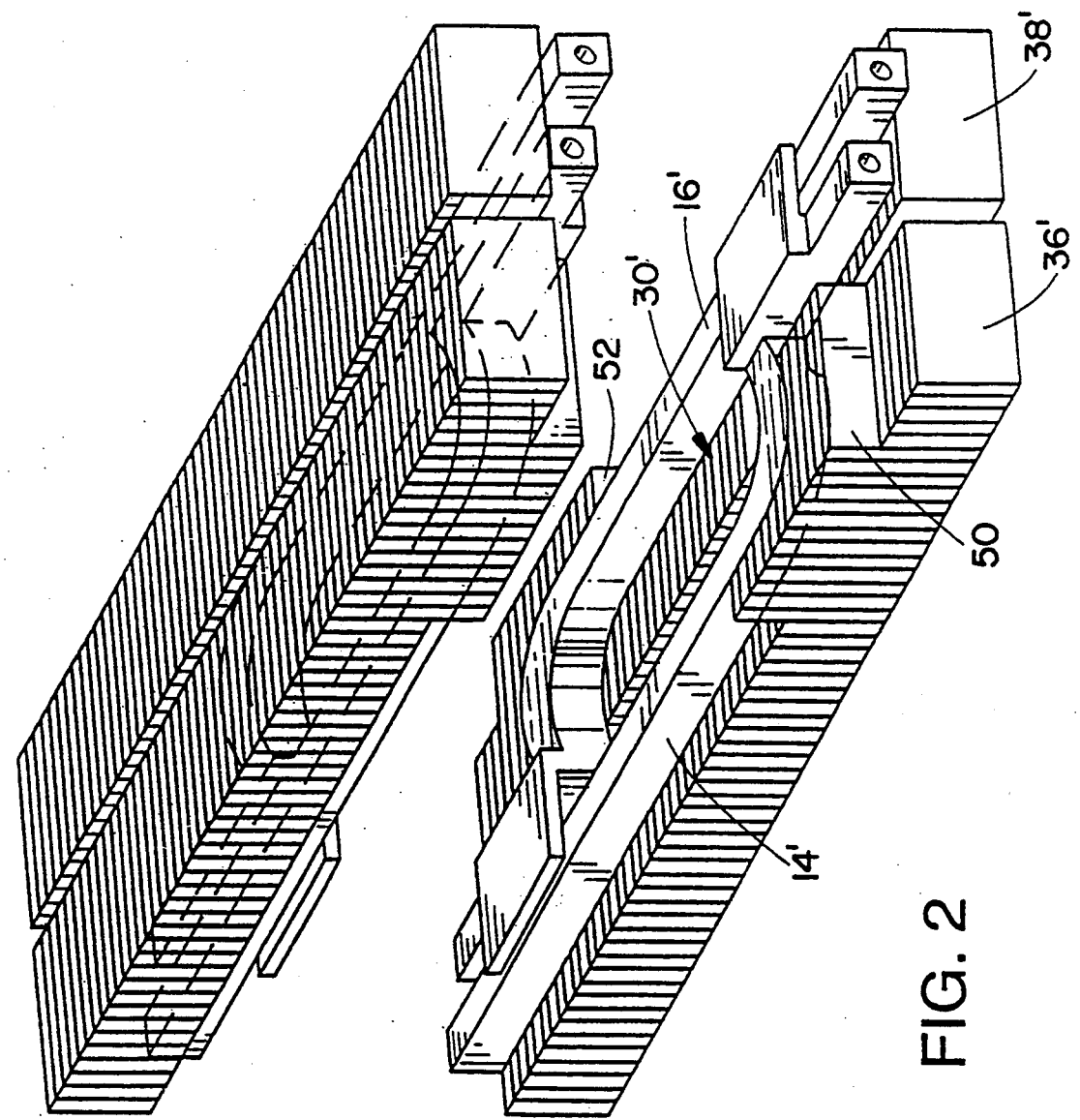
FIG. 2 is a second embodiment of the present invention.

With particular reference to FIG. 2, an alternative embodiment of the present invention is shown therein. For purposes of illustration, like parts relative to the first embodiment are identified with similar numerals with a primed (') suffix attached. In the second embodiment, it can be seen that the flux guides 36', 38' are modified to include guide portions 50, 52 at second side portions of the J-shaped conductors 14', 16'. Specifically, at the curved J portions 20' of the conductors, the iron flux guides extend additionally towards the strip 24' on a second side of the conductor opposite from the middle spacing 30'. Although disposition of the additional flux guide portions 50, 52 will enhance communication of magnetic flux lines at the curve portions 20', it can be seen that the middle spacing 30' is not obstructed so that the desired relative translation between the conductors can be easily accomplished to similarly provide a fully adjustable transverse flux heating assembly. The flux guide portions 50, 52 merely extend to be about coplanar with the side of the conductors facing and immediately adjacent to the strip 24'.

Figure 3:
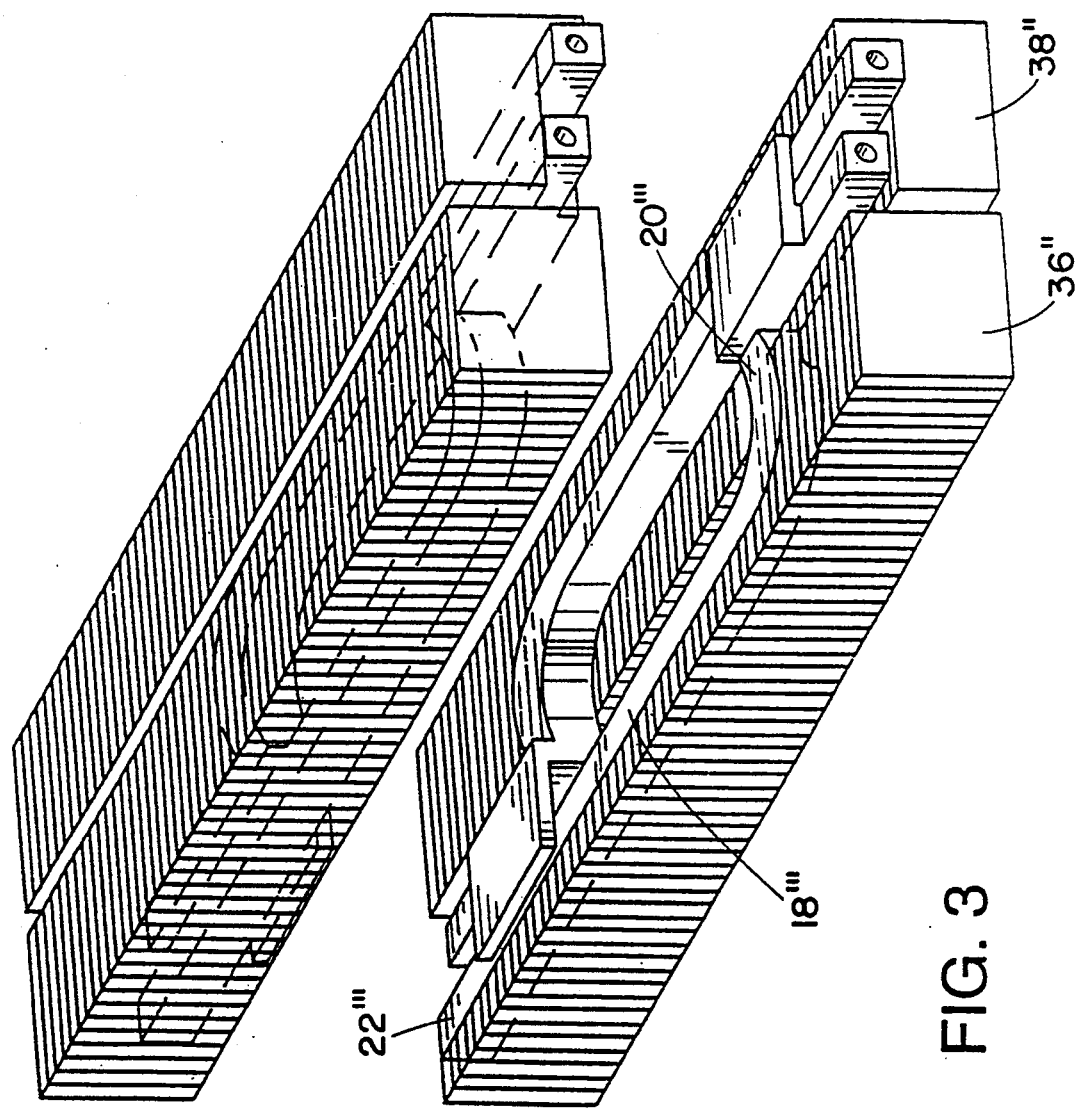
FIG. 3 is a third embodiment of the present invention.

With particular reference to FIG. 3, a third embodiment of the invention is seen wherein flux guides 36", 38" not only extend to an adjacent position near the conductor curve portion 20", but also along the entire extent of the straight portions 18", 22". In this third embodiment, the magnetic flux line communication is further enhanced through the additional flux guide laminations but yet again, the desired goal of keeping the middle spacing 30' completely unobstructed is still accomplished.

Figure 4:
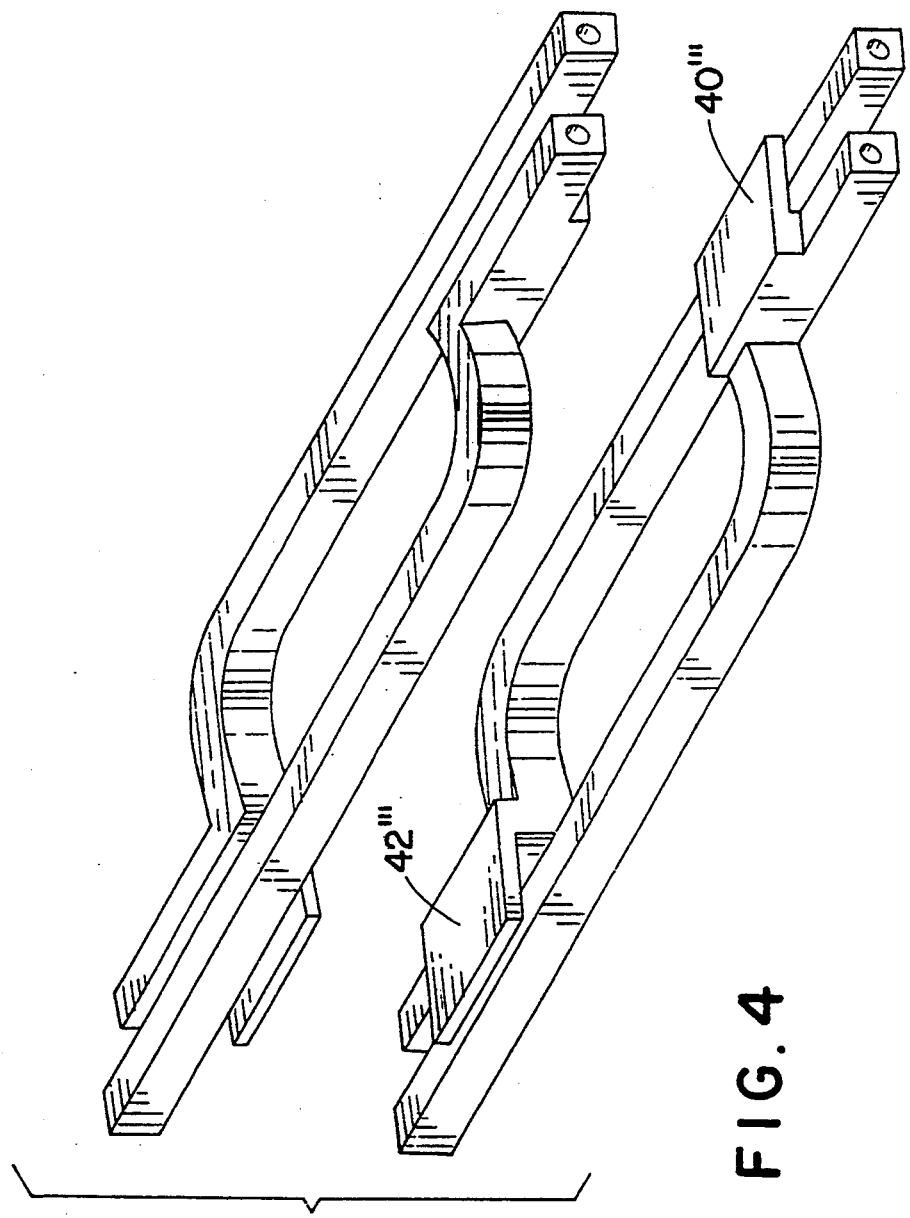
FIG. 4 is a fourth embodiment of the present invention.

With particular reference to FIG. 4, a fourth embodiment of the invention is seen wherein flux guides are eliminated but fully adjustable coils remain including flag portions 40''' and 42'''.

The invention has been described with reference to the preferred embodiments. Modifications and alterations will obviously occur to others upon a reading and understanding of this specification. It is the intention of the inventors to include all such modifications and alterations as a part of this invention to the extent that they come within the scope of the appended claims.

Having thus described the invention, we now claim:

1. An adjustable width transverse flux heating assembly for induction heating of a workpiece including
   first and second J-shaped conductors disposed in a common plane to comprise an inductive coil and to form a middle spacing in an internal cross-sectional area of the coil; and
   first and second flux guides associated respectively with the first and second J-shaped conductors to enhance communication of a magnetic field in a direction transverse to the common plane, wherein the flux guides are disposed about the conductors and spaced from the middle spacing to accommodate selective relative translation of the conductors in the common plane.

2. The heating assembly as defined in claim 1 wherein each of the flux guides are disposed on a first side of the conductors.

3. The heating assembly as defined in claim 1 wherein each of the flux guides are disposed on a first and second side of the conductors, wherein the second side is opposite of the conductor from the middle spacing.

4. The heating means as defined in claim 1 wherein the conductors include adjacent straight end portions and further include a means for shielding flux lines from being communicated away from the inductive coil at the adjacent straight end portions.

5. The heating means as defined in claim 4 wherein the means for shielding comprises a flag portion depending from the first J-shaped conductor and extending across the second J-shaped conductor intermediate the conductors.

6. An induction heating system for metal strip particularly suitable for ready adjustment in heating zone width for ease in accommodation of selectively varying strip widths including
   opposed J-shaped conductors disposed in a common plane to form an inductive heating coil wherein a middle spacing defined by inner perimeters of the conductors is unobstructed for free selective relative movement of the conductors to one another; and
   means for shielding flux lines from being communicated away from the coil disposed at adjacent conductor portions exterior of the middle spacing.

7. The induction heating system as defined in claim 6 wherein the means for shielding comprises a flag portion of a first J-shaped conductor extending over and across an opposed second J-shaped conductor.

* * * * *